United States Patent
Xie et al.

(10) Patent No.: US 9,268,744 B2
(45) Date of Patent: Feb. 23, 2016

(54) PARALLEL BIT REVERSAL DEVICES AND METHODS

(75) Inventors: Shaolin Xie, Beijing (CN); Donglin Wang, Beijing (CN); Jie Hao, Beijing (CN); Tao Wang, Beijing (CN); Leizu Yin, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 295 days.

(21) Appl. No.: 14/118,452

(22) PCT Filed: Dec. 31, 2011

(86) PCT No.: PCT/CN2011/085177
§ 371 (c)(1),
(2), (4) Date: Nov. 18, 2013

(87) PCT Pub. No.: WO2013/097235
PCT Pub. Date: Jul. 4, 2013

(65) Prior Publication Data
US 2014/0089370 A1    Mar. 27, 2014

(51) Int. Cl.
*G06F 15/00* (2006.01)
*G06F 17/14* (2006.01)
*G06F 7/76* (2006.01)

(52) U.S. Cl.
CPC .............. *G06F 17/142* (2013.01); *G06F 7/762* (2013.01); *G06F 7/768* (2013.01)

(58) Field of Classification Search
CPC ............................... G06F 17/142; G06F 7/762
USPC ................................................ 708/400–409
See application file for complete search history.

(56) References Cited

U.S. PATENT DOCUMENTS

| 7,640,284 | B1 | 12/2009 | Goodnight et al. |
| 8,051,239 | B2 * | 11/2011 | Nieminen ............... G06F 9/345 711/157 |
| 8,612,505 | B1 * | 12/2013 | Ma ........................ G06F 17/142 708/404 |
| 2003/0028571 | A1 | 2/2003 | Jin |
| 2010/0185715 | A1 * | 7/2010 | Persson ................. G06F 17/142 708/404 |

FOREIGN PATENT DOCUMENTS

CN      101072218 A      11/2007
CN      101520769 A       9/2009

OTHER PUBLICATIONS

International Search Report for corresponding International Application No. PCT/CN2011/085177, mailed Oct. 18, 2012 (2 pages).
Written Opinion for corresponding International Application No. PCT/CN2011/085177, mailed Oct. 18, 2012 (3 pages).

* cited by examiner

*Primary Examiner* — Tan V. Mai
(74) *Attorney, Agent, or Firm* — Osha Liang LLP

(57) ABSTRACT

A parallel bit reversal device and method. The device includes a parallel bit reversal unit, a butterfly computation and control unit, and a memory. The butterfly computation and control unit is coupled to the memory via a data bus. The parallel bit reversal unit is configured to bit-reverse butterfly group data used by the butterfly computation and control unit. The parallel bit reversal unit includes an address reversing logic coupled to the butterfly computation and control unit, and configured to perform mirror reversal and right-shift operations on a read address from the butterfly computation and control unit.

10 Claims, 4 Drawing Sheets

PARALLEL BIT REVERSAL DEVICES AND METHODS

CROSS-REFERENCE TO RELATED APPLICATIONS

This is a national stage application based on PCT/CN2011/085177, filed on Dec. 31, 2011. This application claims the priority from the same, and hereby incorporates the same by reference in its entirety.

TECHNICAL FIELD

The present application relates to storage and arrangement of bit-reversed data in Integrated Circuit (IC) designs associated with Fast Fourier Transform (FFT) and IC structures, and more particular to parallel bit reversal devices and methods.

BACKGROUND

Signal processing systems are typically required to convert signals between time and frequency domains. The Fast Fourier Transform (FFT) algorithm enables such signal conversion between time and frequency domains. Compared with other transform algorithms, FFT has advantages of uniform structure and less computation, and thus has been widely used in signal processing systems.

FFT takes N points of data as input and outputs N points of data. In general, a transform from time domain (TD) to frequency domain (FD) is called forward transform, while a transform from frequency to time domain is called inverse transform. The order in which TD data are arranged according to sampling time is called "natural order," that is, the sampling time of the data points is incremental. Also, the order in which FD data are arranged according to their frequencies is called "natural order," that is, the frequencies corresponding to the data points are incremental. As opposite to the "natural order," "bit reversal" refers to mirror-reversing a binary representation of an index of each data point in the natural order. The resultant index is an index of the data point in a "bit-reversed order." Assuming that an index is represented with 3 bits. The index 3 in the natural order is (011)2 in the binary form, and it will become (110)2 in the binary form, i.e., 6 in the decimal form, after being mirror-reversed. Accordingly, "6" will be an index for the data point in the bit-reversed order.

Many implementations have been proposed for the FFT algorithm, and are generally classified into to two types of TD decimation and FD decimation. FIG. 1 shows an algorithm using the FD decimation. The original data 100 are sorted in the natural order, and should go through a bit reversal operation 103 to be in the bit-reversed order before the data are used for computation. Output data 102 obtained from the computation on the reversed data 101 are arranged in the natural order. In the TD decimation-type algorithm, the input data are in the natural order, while the output data are in the bit-reversed order. Therefore, the output data should be transformed to be in the natural order before being used for any further processing.

Some patent documents have proposed methods for bit reversal of data. An example is US application publication 2003/0028571A1 ("Real-time method for bit-reversal of large size arrays") which provided a two-step reversal method. The first step includes implementing data bit-reversal of large size arrays between an external storage and an on-chip memory using DMA. The second step includes implementing internal data bit-reversal of small size arrays using a processor. There are problems with the method when implementing internal data bit-reversal of small size arrays using a processor. First, the internal sorting process needs a number of iterations, and specifically, $\log_2 N-1$ iterations are required for data of a length N. Second, data read/write operations in each iteration can be conducted in a scalar fashion, and thus parallel sorting of multiple data cannot be achieved. As a result, the bit-reversal method described in the document is less efficient.

The U.S. Pat. No. 7,640,284B1 ("Bit Reversal Methods for a Parallel Processor") discusses that the company, nVidia, utilizes multiple processing cores or SIMD execution components in a graphic processing unit (GPU) to implement parallel bit reversal. Although the disclosure achieves parallel bit reversal, there are still some problems. First, each processing core or execution component needs to conduct lookup table access and shift operation for many times when calculating bit reversal addresses. Thus, the address calculation alone requires multiple clock cycles, and the execution efficiency is lowered. Second, as described on page 21 line 10 of the patent document, the method can reduce, but not eliminate, memory access conflicts among the multiple processing cores or SIMD execution components. Such memory access conflicts further reduce efficiency of the bit reversal operation.

SUMMARY

Technical Problem to be Solved

The present disclosure is made to improve efficiency of the parallel bit reversal operation, and thus provide better support for multi-granularity parallel FFT computation devices.

Technical Solution

The present disclosure provides a parallel bit reversal device comprising a parallel bit reversal unit, a butterfly computation and control unit, and a memory. The butterfly computation and control unit is coupled to the memory via a data bus. The parallel bit reversal unit is configured to bit-reversing butterfly group data used by the butterfly computation and control unit. The parallel bit reversal unit comprises an address reversing logic coupled to the butterfly computation and control unit, and configured to perform mirror reversal and right-shift operations on a read address from the butterfly computation and control unit. The parallel bit reversal unit further comprises a multi-granularity parallel memory and an address selector. The multi-granularity parallel memory is coupled to the address selector, and is configured to receive an address outputted from the address selector. The multi-granularity parallel memory is further coupled to the butterfly computation and control unit, and is configured to receive written data and a read/write (RAN) granularity value outputted from the butterfly computation and control unit.

The parallel bit reversal unit further comprises a data reversal network coupled to the multi-granularity parallel memory to receive read data from the multi-granularity parallel memory.

The data reversal network is configured to bit-reversing data within a butterfly group.

The address selector is coupled to both the butterfly computation and control unit and the address reversing logic, and is configured to select a RAN address to be outputted to the memory.

The present disclosure further provide a parallel bit reversal method in a parallel bit reversal device comprising a parallel bit reversal unit and a memory, the parallel bit reversal unit comprising a multi-granularity parallel memory, the method comprises: step 200, transferring data from the memory to the multi-granularity parallel memory, dividing equally the transferred data in a natural order into $2^n$ groups, and storing them sequentially in $2^n$ memory blocks of the multi-granularity parallel memory, n is a positive integer; step 201, reversing a data group index of each of the data groups, while keeping an intra-group index of the data group unchanged; step 202, shifting the intra-group index to a higher position while keeping the intra-group index and the data group index unchanged; and step 203, reversing the intra-group index while keeping the data group index unchanged.

The parallel bit reversal device further comprises a butterfly computation and control unit under control of which the above steps are performed.

The parallel bit reversal unit further comprises an address reversing logic and an address selector, and the butterfly computation and control unit is coupled to the address reserving logic via a shift indication line and a read address line.

At step 201, the value on the shift indication line is set to A-n, A being a bit width of the read address line, and at the same time the read address on the read address line is set as the data group index; the address selector selects an output from the address reversing logic as a R/W address for the memory.

At step 203, the data read from the multi-granularity parallel memory is bit reversed in the data reversal network and then outputted to the butterfly computation and control unit.

After step 203, a number $2^n$ of bit-reversed data are obtained at the output of the data reversal network and directly used for butterfly computation.

Technical Effects

The present disclosure stores data in the natural order in a memory supporting multi-granularity parallel access, and reads multiple bit-reversed data in parallel in an address ascending order. The method first divides data to be sorted into groups, and sorts the data according to three criteria: 1. bit reversal between intra-group data and data groups using the multi-granularity access characteristics of the memory; 2. bit reversal of intra-group data using hardware logic component; and 3. bit reversal between data groups using different access addresses. Only one memory access is required throughout the bit reversal process according to the present disclosure, and there is no iteration. The read bit-reversed data can be directly subjected to further operation by a processor, such as FFT butterfly computation. Further, with the method of the present disclosure, there is no access conflict during parallel memory accesses, and the read and sorting operations can be performed in a highly pipelined fashion with very high efficiency. In addition, the present disclosure can specify parallel granularity flexibly according to requirements of particular applications.

DETAILED DESCRIPTION OF THE EMBODIMENTS

In the following, the present disclosure will be further explained with reference to the figures and specific embodiments so that the objects, solutions and advantages of the present disclosure become more apparent.

To achieve parallel bit reversal, a parallel granularity $W=2^n$ (n is a positive integer) is first defined, and the parallel granularity represents the number of data points that can be read from a memory and sorted in parallel. Before starting the bit reversal operation, data are divided so that every W points of data form a data group. For data of a length $N=2^T$, T bits are required for representing an index of each data point. After dividing into groups, each of the N data points has its index formed by two portions: a data group index g and an intra-group index b. For the $2^T$ data points and the parallel granularity $2^n$, there are in total $2^{T-n}$ data groups. Let T-n=g, G bits are required to represent the data group index g, i.e., g= $g_{G-1} \ldots g_1 g_0$, and n bits are required to represent the intra-group index, i.e., $b=b_{n-1} \ldots b_1 b_0$. The index for each data point has a binary representation formed by concatenating g and b. In the natural order, the data group index is placed in a higher position, and the intra-group index is placed in a lower position, that is:

Natural-order data address=$(g_{G-1} \ldots g_1 g_0 b_{n-1} \ldots b_1 b_0)$  (expression 1)

A corresponding bit-reversed data address is:

Bit-reversed data address=$(b_0 b_1 \ldots b_{n-1} g_0 g_1 \ldots g_{G-1})$  (expression 2)

Figure 3:
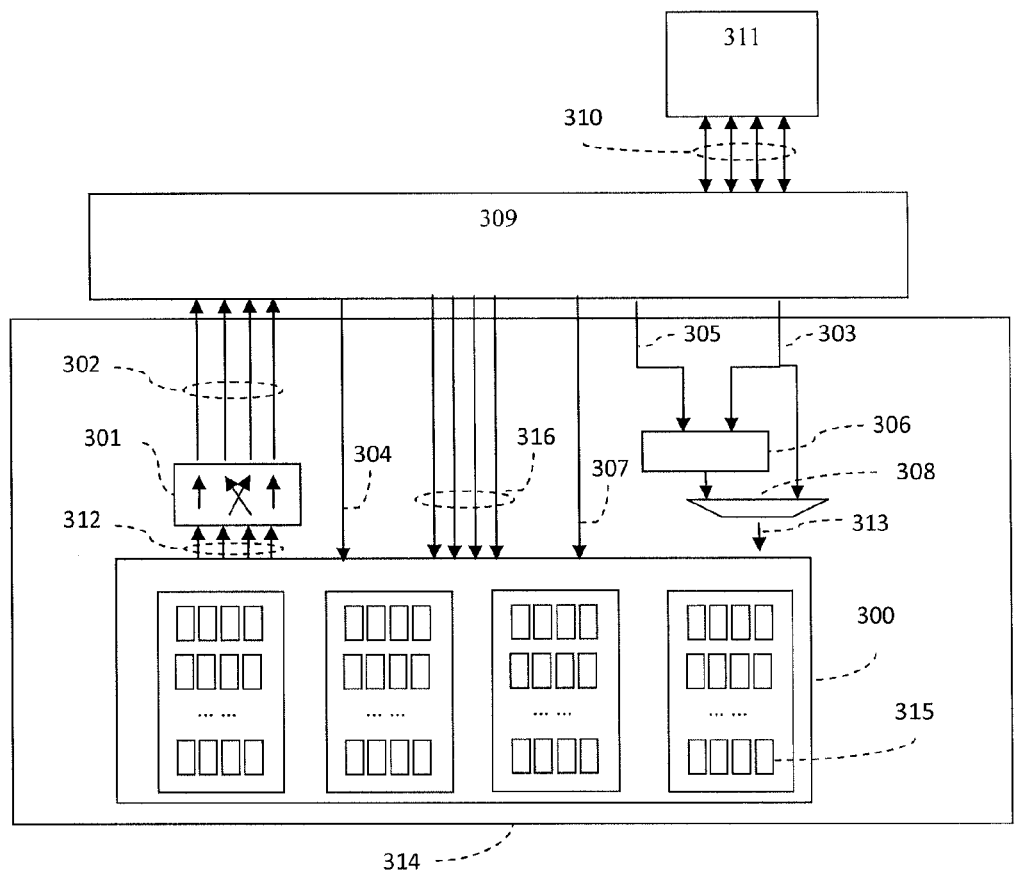
FIG. 3 is a schematic block diagram of a parallel bit reversal device according to the present disclosure.

FIG. 3 is a schematic block diagram of a parallel bit reversal device according to an embodiment of the present disclosure. The parallel bit reversal device includes a parallel bit reversal unit 314, a butterfly computation and control unit 309, and a large-capacity memory 311.

The butterfly computation and control unit 309 is coupled to the large-capacity memory 311 via a data bus 310. The parallel bit reversal unit 314 includes a multi-granularity parallel memory 300, an address reversing logic 306, an address selector 308, and a data reversal network 301. When the parallel granularity is set to $2^n$, the multi-granularity parallel memory 300 includes $2^n$ memory blocks.

The multi-granularity parallel memory 300 has an address line 313 coupled to an output of the address selector 308 to receive an address outputted from the address selector.

The multi-granularity parallel memory 300 also has a write enable (WE) signal line 307, written data lines 316, and a R/W granularity indication line 304, all of which are coupled to the butterfly computation and control unit 309 to receive a WE signal, written data and a value of R/W granularity, respectively, from the butterfly computation and control unit 309.

The multi-granularity parallel memory 300 further has read data lines 312 coupled to an input of the data reversal network 301 to output read data thereto.

The data reversal network 301 has its output 302 coupled to the butterfly computation and control unit 309, is configured to reverse intra-group data. When the parallel bit reversal device 314 has a parallel granularity of $2^n$, the data reversal network 301 has a number $2^n$ of input data on its read data line 312, and also a number $2^n$ of output data at its output 302. Let a vector of input data is X with an index i ($0 \le i < n$), and X[i] denotes the ith input data; a vector of output data is Y with an index j ($0 \le j < n$), and Y[j] denotes the jth output data; and br(i) represents a mirror bit reversal of i. Correspondence between X and Y in the data reversal network 301 is:

$$Y[i]=X[br(i)]$$

The address selector 308 has one input coupled to an R/W address line 303 of the butterfly computation and control unit 309, and the other input couple to the output of the address reversing logic 306, and is configured to select an R/W address to be outputted to the memory 300.

The address reversing logic 306 has one input coupled to a shift indication line 305 of the butterfly computation and control unit 309, and the other input coupled to the R/W address line 303 of the butterfly computation and control unit 309, and is configured to perform mirror bit-reversal and right-shift operations on a binary representation of a read address inputted from the R/W address 303. The read address has a fixed bit width determined by a maximal data length M and a parallel granularity $2^n$ that the parallel bit reversal unit 314 can support, that is, the bit width of the read address is $A=(\log_2 M - n)$. If the bit width g of a data group is less than A, 0's are padded at the higher position to form the read address. Then, the address reversing logic 306 shifts a result of the mirror bit reversal operation rightward by a shift distance A-g. If the read address 303 has a bit width A=16, and the data group has a bit width g=3, i.e., $g=g_2 g_1 g_0$, the read address 303 is inputted as (0000 0000 0000 $0 g_2 g_1 g_0$), and be mirror bit-reversed into ($g_0 g_1 g_2 0$ 0000 0000 0000). Then, with a shift distance of 13, the shifted read address 303 is (0000 0000 0000 $0 g_0 g_1 g_2$), which is the output of the address reversing logic 306.

The bit reversal process may be abstracted into changes of data address ($g_{G-1} \ldots g_1 g_0 b_{n-1} \ldots b_1 b_0$). The original data address is denoted as the above (expression 1), and the reversed data address is denoted as the above (expression 2).

Figure 1:
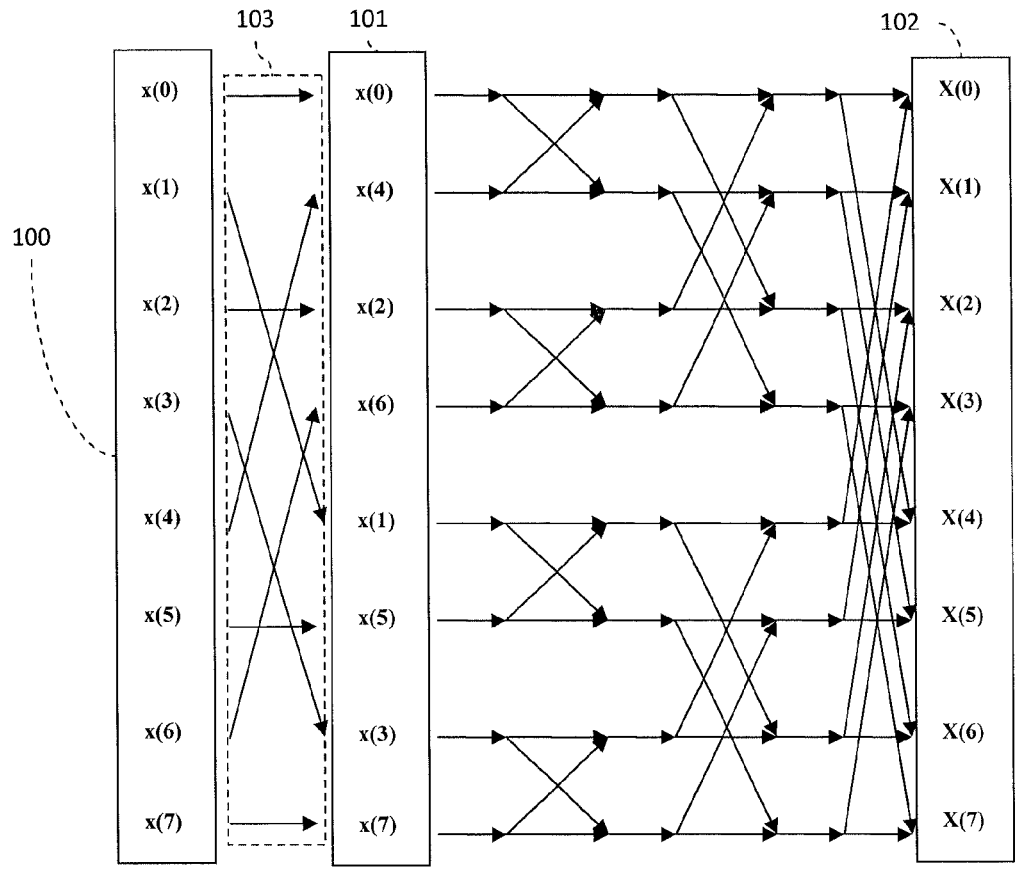
FIG. 1 is a flowchart of a radix 2 FFT algorithm with decimation in time when the data length is 8.
Figure 2:
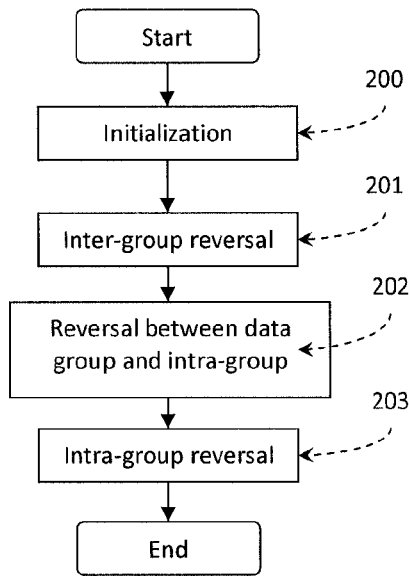
FIG. 2 is a flowchart of a parallel bit reversal method according to the present disclosure.

The method for parallel bit reversal of a data address ($g_{G-1} \ldots g_1 g_0 b_{n-1} \ldots b_1 b_0$) in the natural order may include four steps as shown in FIG. 2.

Figure 4:
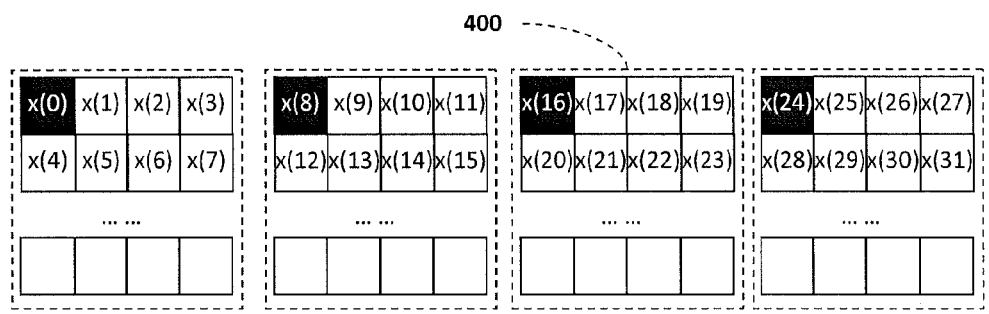
FIG. 4 is a schematic diagram showing distribution of multiple data in a memory before a bit reversal operation when the parallel granularity is 4, and the data length is 32.

Step 200, Initialization. The butterfly computation and control unit 309 transfers data from the large-capacity memory 311 to the multi-granularity parallel memory 300. The data are transferred using the data bus 310 and the written data lines 315. At this moment, the address selector 308 selects a read address on the R/W address 303 as its output, the granularity on the R/W granularity indication line 304 is $2^n$, and the data level on the WE signal line 304 is high. The transferred data in the natural order are divided equally into $2^n$ groups, which are stored sequentially in the $2^n$ memory blocks 400 of the multi-granularity parallel memory 300 as shown in FIG. 4 by assuming that the data length N=32, and the parallel granularity is 4.

Step 201, Inter-Group Reversal. This step reverses the data group index to change the data address g from ($g_{G-1} \ldots g_1 g_0$) to ($g_0 g_1 \ldots g_{G-1}$).

During the process, the butterfly computation and control unit 309 groups the value on the shift indication 305 to be A-n, where A denotes the bit width of the R/W address line 303, and at the same time, groups the read address on the R/W address line 303 to be the data group index $g=(g_{G-1} \ldots g_1 g_0)$. The address selector 308 selects the output of the address reversing logic 306 as a R/W address for the memory 300.

Step 202, Reversal Between Data Group and Intra-Group. This step keeps the intra-group index and the data group index unchanged, but introduces the intra-group index to the higher position so that the data address $g=(g_{G-1} \ldots g_1 g_0)$ is changed to ($b_0 b_1 \ldots b_{n-1} g_0 g_1 \ldots g_{G-1}$).

During the process, the granularity on the R/W granularity indication line 304 is set to 1, the data level on the WE signal line 307 is set to be low, and a group of data is read from the memory according to an address on the address line 313, as shown in FIG. 3.

This operation effectively shifts the intra-group index b to the higher position. The principle for achieving such effect is as follows. The data in the natural order have been divided into $2^n$ groups and stored in the $2^n$ memory blocks 500. As such, the natural-order indices of data at the same location in the memory blocks 500 differ from each other by $N/2^n=2^G$. When the R/W granularity 304 is set as 1, one piece of data is read from the memory unit at the same location in each of the memory blocks 500, and these data are concatenated into a data group. This operation is equivalent to extracting a piece of data from a natural-order data at an interval of $N/2^n=2^G$, and concatenating the extracted pieces of data into a data group. If the intra-group index of the read data is $b=b_{n-1} \ldots b_1 b_0$, and the extraction starts from the address $g=g_0 g_1 \ldots g_{G-1}$, extracting 1 piece of data every $2^G$ pieces of data is equivalent to extracting each data at the following address:

$$b \times G + g = (b << G)|g = b_{n-1} \ldots b_1 g_0 g_1 \ldots g_{G-1}$$

The expression represents the expected data address ($b_{n-1} \ldots b_1 b_0 g_0 g_1 \ldots g_{G-1}$) at step 201.

Step 203, Intra-Group Reversal. This step keeps the data group index unchanged, but reverses the intra-group index to change the data address g from ($b_{n-1} \ldots b_1 b_0 g_0 g_1 \ldots g_{G-1}$) to ($b_0 b_1 \ldots b_{n-1} g_0 g_1 \ldots g_{G-1}$).

This step utilizes the data reversal network 301. After passing the data read via the read data line 312 from the multi-granularity parallel memory 300 through the data reversal network 301, the data address is changed to ($b_0 b_1 \ldots b_{n-1} g_0 g_1 \ldots g_{G-1}$), and outputted at the output 302 directly to the butterfly computation and control unit 309. In this way, the $2^n$ pieces of data have been bit-reversed in parallel.

After step 203, the $2^n$ pieces of data at the output 302 are bit-reversed and can be directly used for butterfly computation.

Multi-granularity Parallel Memory

Hereafter, the specific structure of the multi-granularity parallel memory 300 included in the parallel bit reversal device according to the present disclosure will be described with reference to FIGS. 5 and 6.

To facilitate description of the present disclosure, the bit width of each type of data is measured by using a memory unit as reference. The memory unit is defined as the addressing unit of the memory, that is, the minimal data bit width by which a R/W operation can be performed in the memory. In the description, phrases including "bit width of W" should be construed as bits of W memory units. If the memory unit is of an 8 bit byte, the actual bit width of the memory having a 4-bit-width R/W port is 4×8=32 bits. Further, all objects are numbered from 0 in a left-to-right manner. The term "granularity" represents the number of memory units having consecutive addresses. Hereafter, symbols are defined as follows:

W: the bit width of the memory R/W port; it must be a power of 2 (i.e., W is the nth power of 2, and n is a natural number);

K: $K=\log_2 W$, and K+1 represents a kind of R/W granularity supported by the memory;

k: a parameter of memory R/W granularity; it is a natural number, and $0 \leq k \leq K$; an actual R/W granularity is denoted as $g=2^k$;

g: $g=2^k$, denoting the memory R/W granularity, $1 \leq g \leq W$;

N: the size of a memory block.

Although it is assumed in the figures of the present disclosure that W=4, the present disclosure is also applicable when W is some other power of 2.

Figure 5:
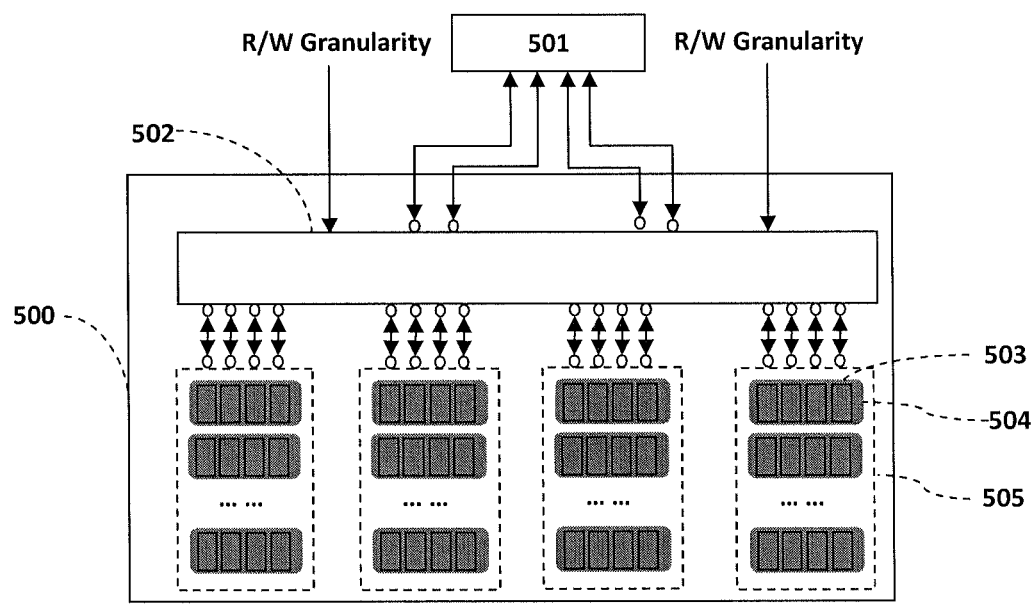
FIG. 5 is a schematic diagram showing a logic structure of a multi-granularity parallel memory according to the present disclosure.

As shown in FIG. 5, the multi-granularity parallel memory includes W memory blocks 505, and a data gating network 502. Each of the memory blocks 505 is a 2-dimension (2D) array consisting of memory units 503, and each row 504 of the 2D array must include W memory units 503. For each memory block, one row 504 can be read/written at a time.

The data gating network 502 selects logically, from the W memory blocks 505, W memory units 503 as R/W targets according to the R/W address and the R/W granularity.

The memory of the present disclosure supports multiple R/W granularities. With different R/W granularities, the start address of each memory block 505 changes. The parameter k denotes different R/W granularities, and the actual R/W granularity is $g=2^k$.

Figure 6:
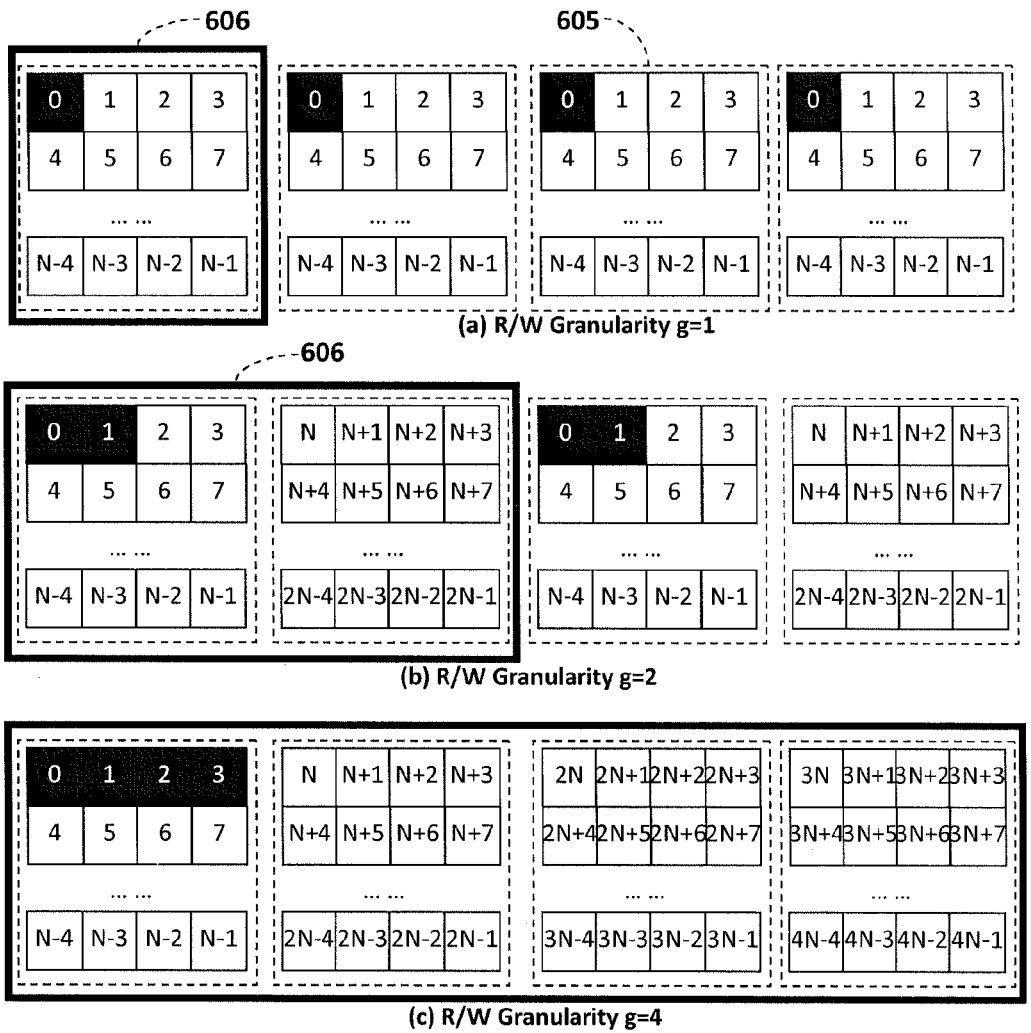
FIG. 6 is a schematic diagram showing addressing schemes and logic Bank divisions with different R/W granularities in a multi-granularity parallel memory according to the present disclosure.

FIG. 6 shows the addressing configurations of each memory block 605 of the memory in different R/W granularities when W=4. For the R/W granularity g, every g adjacent memory blocks 605 are concatenated into a logic Bank 606. All the logic Banks 606 have the same start address. The start addresses of the memory blocks in each logic Bank 606 are consecutive. The addressing range of each logic Bank 606 is 0~gN-1, and the addressing range of the entire memory is 0~gN-1.

In a read operation, the memory transmits a R/W address and a R/W granularity to each logic Bank 606. Each logic Bank 606 reads and transfers g memory units to the memory R/W port 501 via the data gating network 502. Data read from W/g logic Banks 606 are concatenated from left to right into output data of a bit width W.

In a write operation, the memory divides data transferred from the memory R/W port 501 into W/g portions, each portion of data having a bit width of g. The memory transmits the ith portion of data to the ith logic Bank 606 ($0 \leq i < W/g$), and at the same time transmits a R/W address and a R/W granularity to each logic Bank 606. Each logic Bank 606 writes g memory units.

The foregoing description of the embodiments illustrates the objects, solutions and advantages of the present disclosure. It will be appreciated that the foregoing description refers to specific embodiments of the present disclosure, and should not be construed as limiting the present disclosure. Any changes, substitutions, modifications and the like within the spirit and principle of the present disclosure shall fall into the scope of the present disclosure.

What is claimed is:

1. A parallel bit reversal device comprising:
a memory for storing data;
a butterfly computation and control unit coupled to the memory via a data bus; and
a parallel bit reversal unit configured to bit-reversing butterfly group data used by the butterfly computation and control unit wherein the parallel bit reversal unit comprises:
an address reversing logic coupled to the butterfly computation and control unit and configured to perform mirror reversal and right-shift operations on a read address from the butterfly computation and control unit;
an address selector; and
a multi-granularity parallel memory coupled to the address selector and the butterfly computation and control unit, and configured to receive an address outputted from the address selector and receive written data and a read/write (R/W) granularity value outputted from the butterfly computation and control unit.

2. The parallel bit reversal device of claim 1, wherein the parallel bit reversal unit further comprises a data reversal network coupled to the multi-granularity parallel memory to receive read data from the multi-granularity parallel memory.

3. The parallel bit reversal device of claim 2, wherein the data reversal network is configured to bit-reversing data within a butterfly group.

4. The parallel bit reversal device of claim 2, wherein the address selector is coupled to both the butterfly computation and control unit and the address reversing logic, and is configured to select a R/W address to be outputted to the memory.

5. A parallel bit reversal method in a parallel bit reversal device comprising a parallel bit reversal unit and a memory, the parallel bit reversal unit comprising a multi-granularity parallel memory, the method comprises:
transferring data from the memory to the multi-granularity parallel memory, dividing equally the transferred data in a natural order into $2^n$ groups, and storing them sequentially in $2^n$ memory blocks of the multi-granularity parallel memory, n is a positive integer;
reversing a data group index of each of the data groups, while keeping an intra-group index of the data group unchanged;
shifting the intra-group index to a higher position while keeping the intra-group index and the data group index unchanged; and
reversing the intra-group index while keeping the data group index unchanged.

6. The parallel bit reversal method of claim 5, wherein the parallel bit reversal device further comprises a butterfly computation and control unit under control of which the above steps are performed.

7. The parallel bit reversal method of claim 6, wherein the parallel bit reversal unit further comprises an address reversing logic and an address selector, and the butterfly computation and control unit is coupled to the address reserving logic via a shift indication line and a read address line.

8. The parallel bit reversal method of claim 7, wherein at the step of reversing a data group index of each of the data groups, the value on the shift indication line is set as A-n, A being a bit width of the read address line, and the read address on the read address line is set as the data group index; the address selector selects an output from the address reversing logic as a R/W address for the memory.

9. The parallel bit reversal method of claim 8, wherein at the step of reversing the intra-group index, the data read from the multi-granularity parallel memory is bit reversed in the data reversal network and outputted to the butterfly computation and control unit.

10. The parallel bit reversal method of claim 9, wherein after the step of reversing the intra-group index, a number $2^n$ of bit-reversed data are obtained at the output of the data reversal network and directly used for butterfly computation.

* * * * *